United States Patent [19]

Jerman

[11] Patent Number: 5,271,597
[45] Date of Patent: Dec. 21, 1993

[54] BIMETALLIC DIAPHRAGM WITH SPLIT HINGE FOR MICROACTUATOR

[75] Inventor: John H. Jerman, Palo Alto, Calif.

[73] Assignee: IC Sensors, Inc., Milpitas, Calif.

[21] Appl. No.: 891,354

[22] Filed: May 29, 1992

[51] Int. Cl.$^5$ .............................................. F16K 7/14
[52] U.S. Cl. ...................................... 251/11; 251/331; 251/129.01; 356/345; 60/528; 60/529
[58] Field of Search ....................... 251/11, 331, 129.01; 356/345; 60/528, 529

[56] References Cited

U.S. PATENT DOCUMENTS

| | | | |
|---|---|---|---|
| 4,318,071 | 3/1982 | Shepherd | 337/136 |
| 4,756,508 | 7/1988 | Giachino et al. | 251/331 |
| 4,825,262 | 4/1989 | Mallinson | 356/352 |
| 4,859,060 | 8/1989 | Katagiri et al. | 356/352 |
| 4,864,824 | 9/1989 | Gabriel et al. | 60/527 |
| 5,058,856 | 10/1991 | Gordon et al. | 251/11 |
| 5,069,419 | 12/1991 | Jerman | 251/11 |

OTHER PUBLICATIONS

IEEE CH2783-9/90/0000-0065$01.00 1990, Hal Jerman "Electrically-Activated, Micromachined Diaphragm Valves".

IEEE Conf. Jun. 1991, Hal Jerman "Electrically-Activated, Normally-Closed Diaphragm Valves".

*Primary Examiner*—A. Michael Chambers
*Attorney, Agent, or Firm*—Skjerven, Morrill, MacPherson, Franklin & Friel

[57] ABSTRACT

A microactuator of a silicon substrate having a frame with a central circular flexible diaphragm suspended from the substrate by a hinge. The hinge is a layer of silicon dioxide of uniform thickness which is formed by etching a groove in the silicon substrate and then conformally forming a silicon dioxide layer of uniform thickness in the groove. The substrate backside is then etched to the desired diaphragm thickness, exposing the bottom portion of the silicon dioxide layer which thereby becomes the hinge. Further a split hinge structure includes two such hinges which are parallel in part and so overlap in length, with a silicon bridge portion of the diaphragm lying therebetween. The electrical traces which extend from the frame to the central portion of the diaphragm are deposited on the silicon bridge, minimizing the mechanical stress on the traces due to hinge flexing. The resulting structure has low thermal conductivity and sufficient strength to carry the vertical loads generated by the bimetallic diaphragm. The split hinge allows the metal traces to be substantially planar with the original silicon surface.

14 Claims, 6 Drawing Sheets

BIMETALLIC DIAPHRAGM WITH SPLIT HINGE FOR MICROACTUATOR

BACKGROUND OF THE INVENTION

1. Field of the Invention

This invention relates to thermally responsive semiconductor actuators, and in particular to semiconductor microactuators having deformable members comprised of a bimetallic material where the thermally insulative hinge between the frame and the diaphragm of the actuator is of a uniform thickness and the hinge structure is comprised of two hinges which are parallel for at least part of their lengths.

2. Description of Related and Commonly Invented Art

It is well known to use silicon devices as transducers for converting physical quantities such as force, pressure, temperature, and acceleration into electrical signals which may be provided to electrical processing circuitry. In addition, silicon devices are sometimes used as actuators or transducers, for instance for operating valves.

See, for instance, commonly invented U.S. Pat. No. 5,069,419 issued Dec. 3, 1991, entitled "Semiconductor Microactuator".

Figure 1:
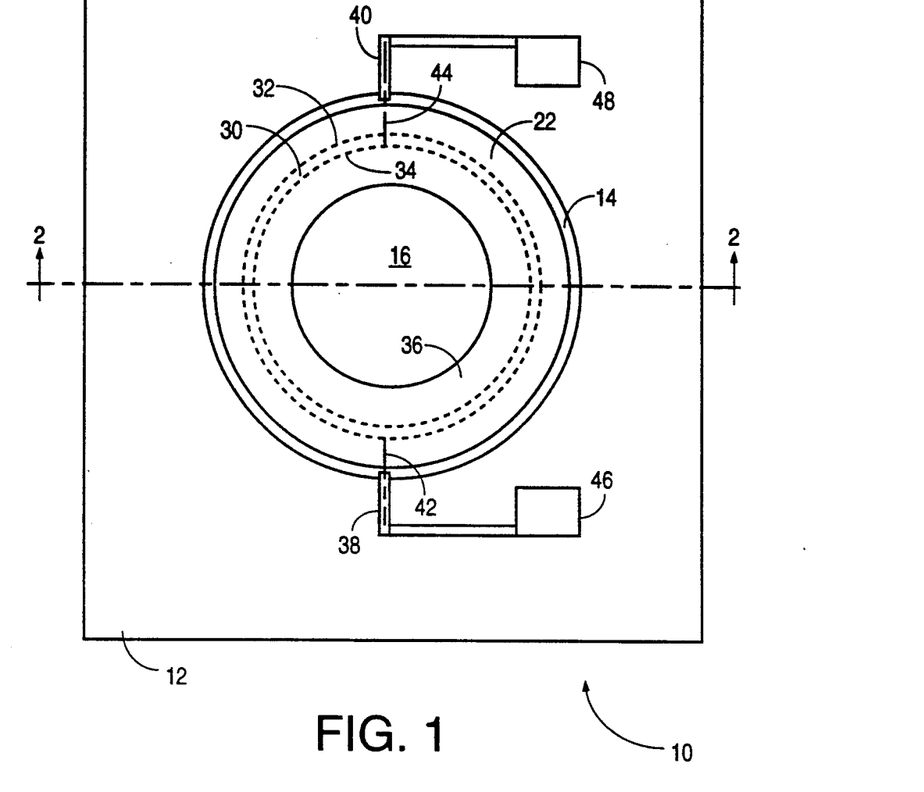
FIG. 1 shows a plan view of a semiconductor microactuator from a commonly invented patent.

FIGS. 1-4 herein are identical to the similarly numbered figures in U.S. Pat. No. 5,069,419. As shown in FIG. 1, the semiconductor microactuator 10 has a silicon semiconductor substrate 12 formed from a crystalline silicon die fabricated from a monocrystalline silicon wafer and having a thickness of 300 micrometers. Suspension means 14 is connected to substrate 12. A movable element 16 is connected to the suspension means 14 to be displaced solely translationally, or in other words irrotationally, with respect to the semiconductor substrate 12.

Figure 2:
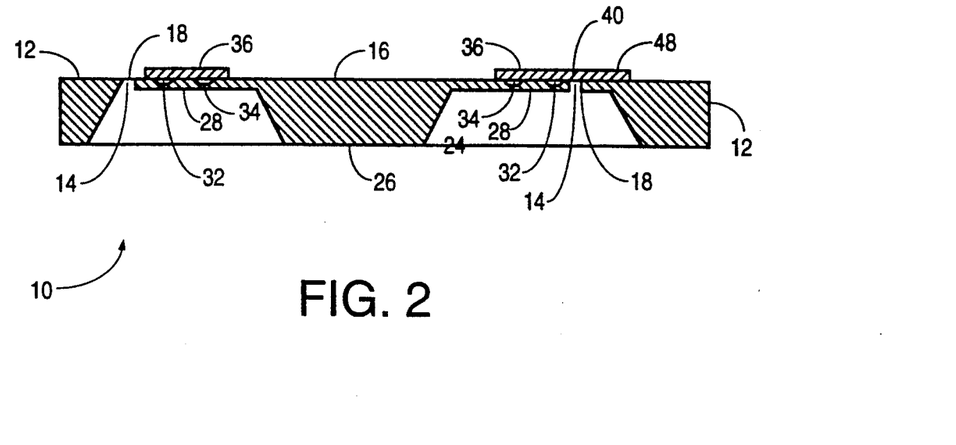
FIG. 2 shows a sectional view of the semiconductor microactuator according to FIG. 1 taken along line 2—2 of FIG. 1
Figure 3:
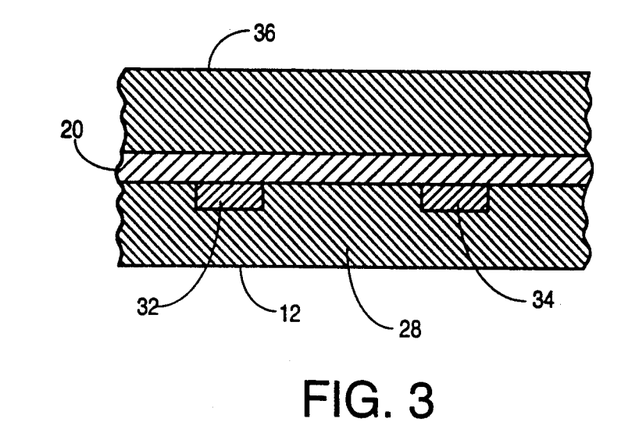
FIG. 3 is an enlar9ed sectional view of the sectional view of FIG. 2 showing details of the heater elements.
Figure 4:
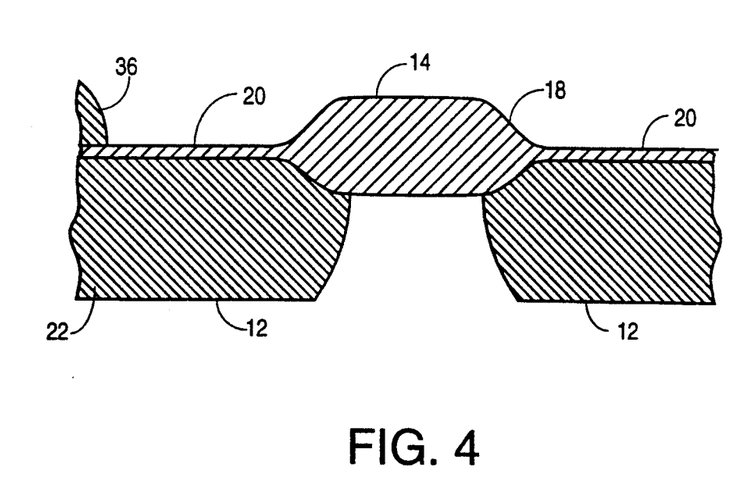
FIG. 4 is an enlarged sectional view of an oxide hinge of the semiconductor microactuator shown in FIG. 2.

Suspension means 14, as seen in FIGS. 1, 2, and 4, includes a hinge 18 comprised of a layer of thermally grown silicon oxide. Hinge 18 is formed integrally with a thinner layer of thermally grown silicon oxide 20 extending over the epitaxial silicon substrate 12. The hinge portion of the thermally grown oxide layer 20 has a thickness of about 3 micrometers (30,000 Å). The other portions of thermally grown oxide layer 20 have a thickness of about 2000 Å. The oxide layer 20 is primarily used for passivation and for electrical insulation. The hinge 18 is circular and in part, defines a circular diaphragm 22, which is connected to it about its periphery. The diaphragm 22 includes a silicon body portion 24 having a boss 26 formed integrally therewith. A thinner diaphragm portion 28 has a heater 30 formed therein comprising a first heater ring 32 and a second heater ring 34. The first and second heater rings 32 and 34 are concentric with the circular diaphragm 22 and are comprised of diffused regions of the monocrystalline silicon, as seen in FIGS. 2 and 3. The silicon oxide layer 20 covers the diffused regions 32 and 34 to insulate them electrically from other portions of the semiconductor microactuator 10. The circular metal ring 36 comprised of electron beam or sputter deposited metal covers a portion of the oxide layer over the heater rings 32 and 34. The heater rings 32 and 34 are connected via metal leads 38 and 40 to diffused current supply regions 42 and 44. The lead 38 is connected to an aluminum bonding pad 46 on the substrate 12. Suitable leads may be wire bonded to the bonding pads 46 and 48 to supply electric current to the bonding pads through the leads 38 and 40 and to the diffused regions 32 and 34.

When the heater rings 32 and 34 receive electric current they heat, causing the thinner diaphragm portions 28 to heat and expand at a thermal expansion rate governed by the thermal expansion coefficient of monocrystalline silicon. The metal ring 36 lying above the diffused regions 32 and 34 also expands, but at a higher rate, due to its greater thermal expansion coefficient, causing the thinner portions 28 to bow and displacing the diaphragm 22. Thus, by controlling the amount of electric current fed to the diffused regions 32 and 34 the amount of displacement of the diaphragm 16 can also be controlled. In addition, since the displacing force is being supplied throughout the entire periphery of the thinner diaphragm region 28, it may be appreciated that relatively high force may be supplied to the movable member or boss portion 26 of the diaphragm so that useful work can be done, for instance, operating a valve.

U.S. Pat. No. 5,069,419 discloses other embodiments of this structure and is incorporated herein by reference. Specifically this patent shows, for instance, use of the above-described microactuator in conjunction with a base substrate including a valve orifice and seat which is contacted by the boss 26, thus closing the valve when the boss is in contact with the valve seat and opening the valve when the boss 26 is not in contact with the valve seat.

The structure of the hinge 18 shown in FIG. 4, however, is deficient in several respects. Hinge 18 of FIG. 4 typically is formed by providing an etch stop in the silicon diaphragm 12 except in the area where the hinge 18 is located. Then when the silicon diaphragm 12 is etched from its backside, a short overetching will remove the silicon beneath the hinge 18. However, in practice it is difficult or inconvenient to provide this etch stop. A heavily doped boron etch stop may be used; however, the heavy doping affects the stress in the silicon diaphragm which makes control of diaphragm deflection difficult and hence reduces the utility of the device. It is possible to use electrochemical etch stops in the silicon, but the complexity of this process is high and there are attendant problems in making a narrow width hinge due to the lateral etch behavior which is a well known property of electrochemical etch processes.

Additionally, a significant function of the hinge 18 is to provide the mechanical boundary condition of the bimetallic diaphragm 12 such that the deflection of the diaphragm 12 is approximately that of a simply supported diaphragm. The difference between clamped and simply supported boundary conditions for bimetallic diaphragms and beams is well known to provide substantially different deflection characteristics of the diaphragm 12, including changing the direction and magnitude of the deflection with increasing temperature of the diaphragm 12. The hinge structure of FIG. 4 is not optimum for providing both this hinge mechanical action and isolating compressive stresses generated by the heating of the bimetallic diaphragm.

Therefore, there is a need for a hinge which is both easier to fabricate and provides more uniform mechanical performance than does the structure of FIG. 4.

SUMMARY OF THE INVENTION

In accordance with the invention a hinge for a bimetallic diaphragm includes a uniformly thick layer of, in one embodiment, silicon dioxide which is formed on the sidewalls of a groove in a silicon substrate and then a portion of the backside of the substrate is etched away to expose the lower portion of the silicon dioxide hinge structure. This hinge structure advantageously acts as a strain reliever from the lateral stresses generated by the bimetallic diaphragm, thus improving performance of the device, and isolating stresses generated due to mounting of the die which includes the entire device.

Also in accordance with the invention, it is possible to adjust the relative strength of the hinge structure by varying the relative thicknesses of the diaphragm materials and hinge material to provide a mechanical boundary condition that is an approximation of a clamped boundary condition rather than a simply supported boundary condition. This is desired, for example, to provide opposite deflection of a centrally supported region with changes in temperature of a bimetallic diaphragm, as is conventionally known. The use of a thermally insulating material for the hinge will still provide the desired thermal insulation for such a structure while providing the clamped boundary condition. The relative strength of the hinge can also be varied by choosing a meandering or serpentine path for the hinge.

Also in accordance with the invention, the electrical connections which connect to the heater elements in the diaphragm do not cross over the hinge. Instead, the hinge structure is split in at least two places creating two overlapping hinge arcs. A narrow silicon bridge which is left between the two arcs extends from the interior of the diaphragm to the frame. This silicon bridge can be made long enough (by allowing the groove arcs to be parallel for a particular length) so that thermal conductance of the silicon bridge between the hinge grooves amounts only to a small fraction of the total conductance of the device, thus not greatly increasing the electrical power needed to drive the device.

This split hinge eliminates the need for instance to run the metal line of the trace directly over the hinge, which might disadvantageously tend to crack the metal line due to the hinge action, thus reducing reliability. Also, the split hinge is an alternative to providing a bridge across the groove which supports the metal line. The bridge across the groove is formed by leaving a layer of silicon nitride to provide a bridge across the groove. This is done by leaving a layer of masking silicon nitride across the groove region which is undercut during the groove etching step. The metal trace layer will tend to remain on top of this bridge during its deposition step, resulting in a relatively flat path across the groove. However, disadvantageously, the stresses in this bridge can be high.

In the split hinge structure the overlap distance can be quite long for instance by providing the two arcs as interlocking, complete spiral paths. Such a hinge would have multiple grooves in any cross section between the center of the diaphragm and the outside frame, further reducing the thermal conductance and providing more lateral stress isolation from the diaphragm to the frame.

Also in accordance with the invention an additional hinge surrounds the center boss of the actuator, to provide thermal isolation to the boss from the heated annular region. This hinge is similar to the outside hinge but is circular in plan rather than split.

The split hinge structure with the conformally shaped silicon dioxide layer has low therma conductivity with sufficient strength to carry the vertical loads generated by the bimetallic diaphragm. The split hinge allows the metal traces to be substantially planar with the original silicon surface and to follow a path not subject to excessive bending forces which might undesirably cause the metal trace to crack during hinge flexing.

DETAILED DESCRIPTION OF THE INVENTION

Figure 5A:
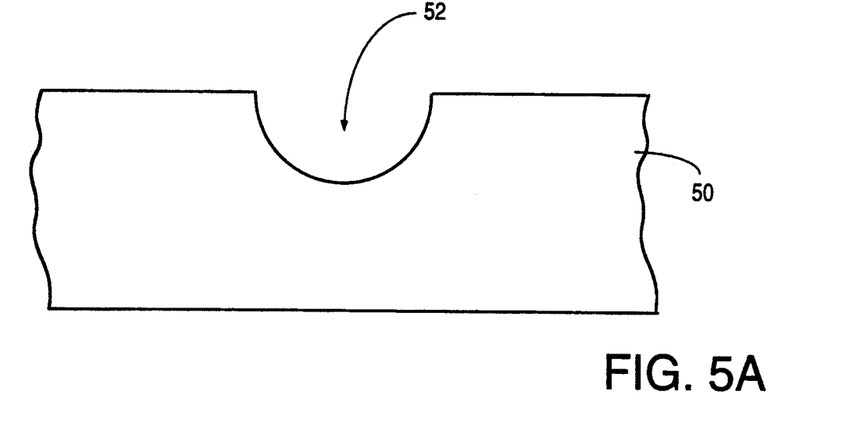
FIGS. 5A to 5C are a process sequence showing formation of a hinge in accordance with the present invention.

FIG. 5A shows the first process step in forming the hinge in accordance with the present invention. Only a portion of the substrate from which the microactuator is to be formed is shown, the remainder of the structure and its fabrication being conventional. A silicon substrate 50 typically of approximately 400 micrometers thickness is conventionally patterned using a mask (not shown) to define an elongated area on the principal surface of the substrate 50 where a groove is to be etched. Then the substrate 50 is etched, such as by plasma etching, to form groove 52 which is typically approximately 40 micrometers wide and 20 micrometers deep. Groove 52 in the top view (not shown) is typically an approximately circular structure, as described in further detail below.

It will be appreciated that the use of an isotropic etching technique such as plasma etching imposes no constraints on the layout of such a groove, and structures including multiple arcs, square corners, or serpentine paths, are easily provided.

Figure 5B:
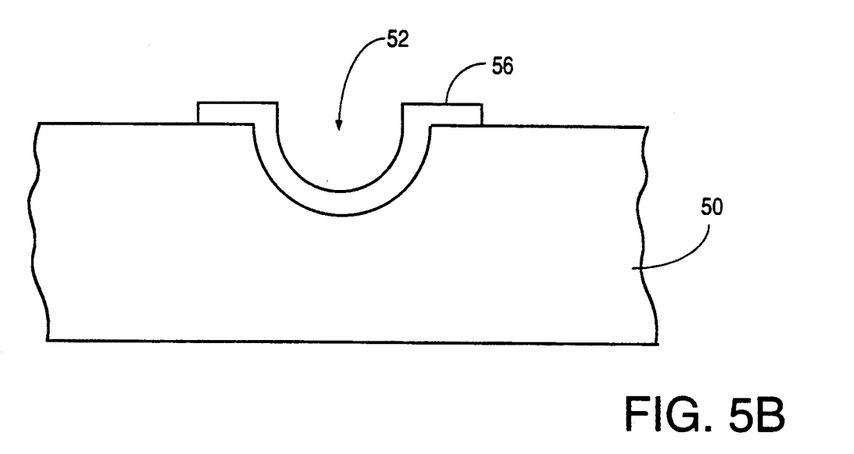

As shown in FIG. 5B in the next process step a silicon dioxide layer 56 is then conventionally grown or deposited to conformally cover the etched groove 52 and the principal surface of the substrate 50. The silicon dioxide layer 56 is then conventionally patterned so that the remaining portions of silicon dioxide layer 56 conformally cover the bottom and sidewalls of the groove and overlap onto the principal surface of substrate 50 a distance of approximately 10 micrometers at either side of the groove. A layer of silicon dioxide 57 approximately 2000 Å thick is formed on diaphragm region 62.

Figure 5C:
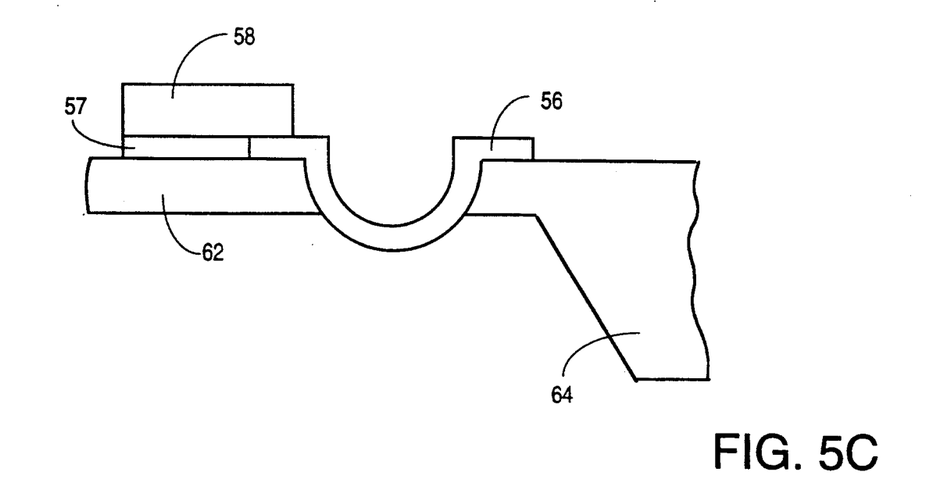

In the next step, as shown in FIG. 5C, a metal such as aluminum layer 58 is formed about 5 micrometers thick on what will become the diaphragm portion of the microactuator for providing the bimetallic structure in conjunction with the underlying substrate 50. In the next step, also shown in FIG. 5C, substrate 50 is etched from its bottom side using the conventional anisotropic etching process so as to remove a substantial portion of substrate 50, leaving the diaphragm portion 62 and the frame portion 64. This etching step exposes the bottom portion of silicon dioxide layer 56. This leaves silicon dioxide layer 56 as the hinge connecting frame portion 64 with diaphragm portion 62. A typical thickness of diaphragm portion 62 is 10 microns and a typical thickness of frame portion 64 is 400 microns.

As described above, in one embodiment in the same step that aluminum layer 58 is formed, the electrical traces are formed which conventionally extend from the frame portion 64 to diaphragm 62 in which are formed the resistive heater elements (not shown) as described in above-referenced U.S. Pat. No. 5,069,419. One method to do so is to extend these metal traces directly over the oxide hinge 56. As explained above, this is less than optimum since the hinge 56 action would tend to crack the metal line. Another method is providing a "bridge" actually extending over the groove. This bridge would include the portions of a silicon nitride layer used to form the trench which are not removed at the edges of the groove but which are undercut during the groove etch step. These remaining nitride regions will provide a support for overlying metal traces resulting in a relatively flat path across the groove. However, the stresses in this bridge provided by the silicon nitride layer are relatively high, tending to result undesirably in flexing and splitting of the metal trace.

Figure 6A:
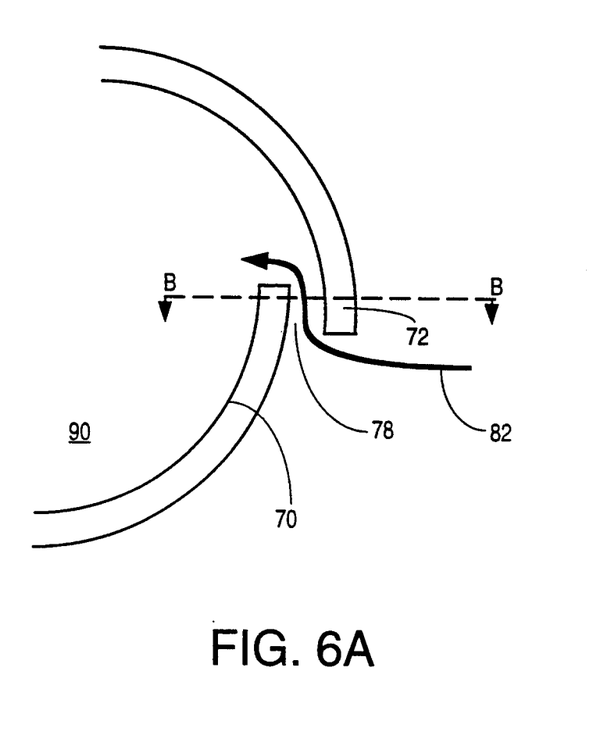
FIG. 6A is a plan view of an overlapping hinge structure in accordance with the present invention.

The preferred method is to provide a hinge structure as in FIG. 6A which shows a portion of the microactuator in a plan view. Two hinges 70 and 72 are each formed as shown by the process steps of FIG. 5. A silicon bridge 78 lies between the two hinge structures. The silicon bridge 78 is part of the diaphragm and has the thickness characteristic of the diaphragm. The metal trace 82 provides an electrical connection from the frame to the heating elements which are formed on the diaphragm interior 90.

The amount of overlap of grooves 70 and 72, i.e. the length of the bridge 78, may be as much as desired and is in one embodiment approximately 10° in angular distance. The longer the silicon bridge 78, the lower the thermal conductance of the bridge as a proportion of the total conductance of the device since the thickness of the silicon at the bridge 78 is small, i.e. the thickness of the diaphragm. Note that the longer the trace on the bridge, the lower the fabrication yield during manufacture. It is to be appreciated that a second electrical trace (not shown) similar to 82 is typically formed at another portion of the diaphragm with a similar overlap between the two hinges 70 and 72 at that point to provide the second electrical trace connecting to the heating elements in the diaphragm interior.

Figure 6B:
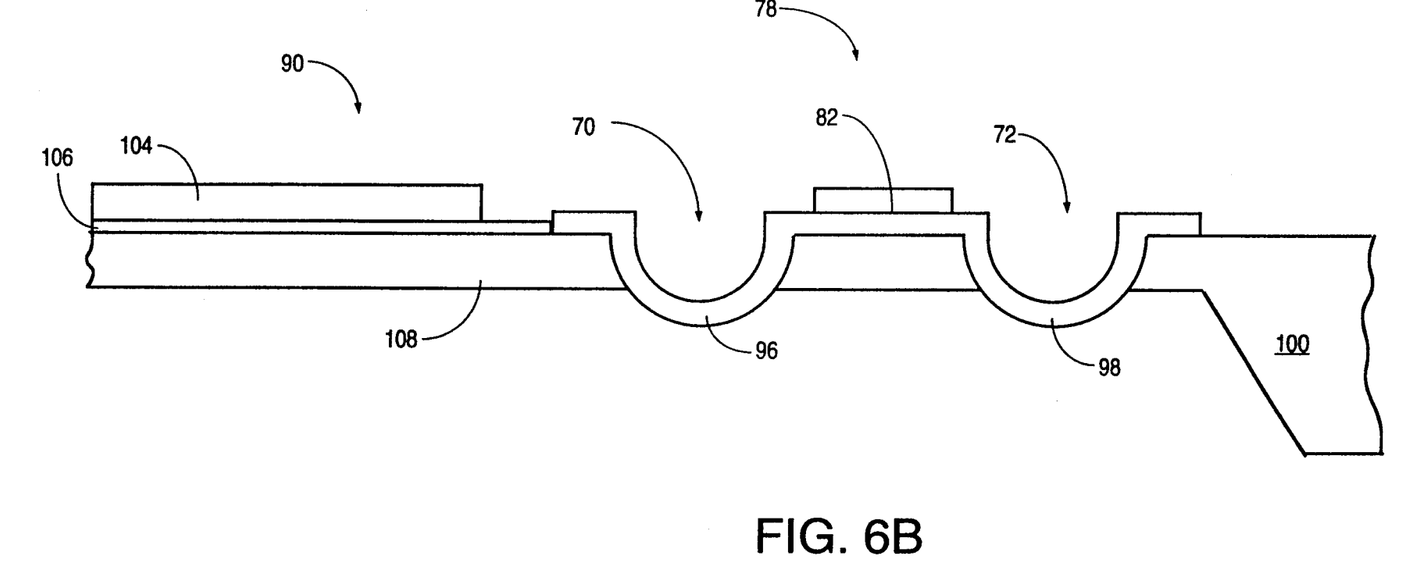
FIG. 6B is a sectional view of FIG. 6A taken along line B—B of FIG. 6A.

FIG. 6B is a cross sectional view through line B—B in FIG. 6A. In addition to the elements shown in FIG. 6A, FIG. 6B shows the thick hinge oxide 96 associated with hinge 70, thick hinge oxide 98 associated with hinge 72, frame 100, and the bimetallic area of inner diaphragm 90 which includes metal layer 104, thin oxide layer 106, and silicon layer 108.

Figure 7:
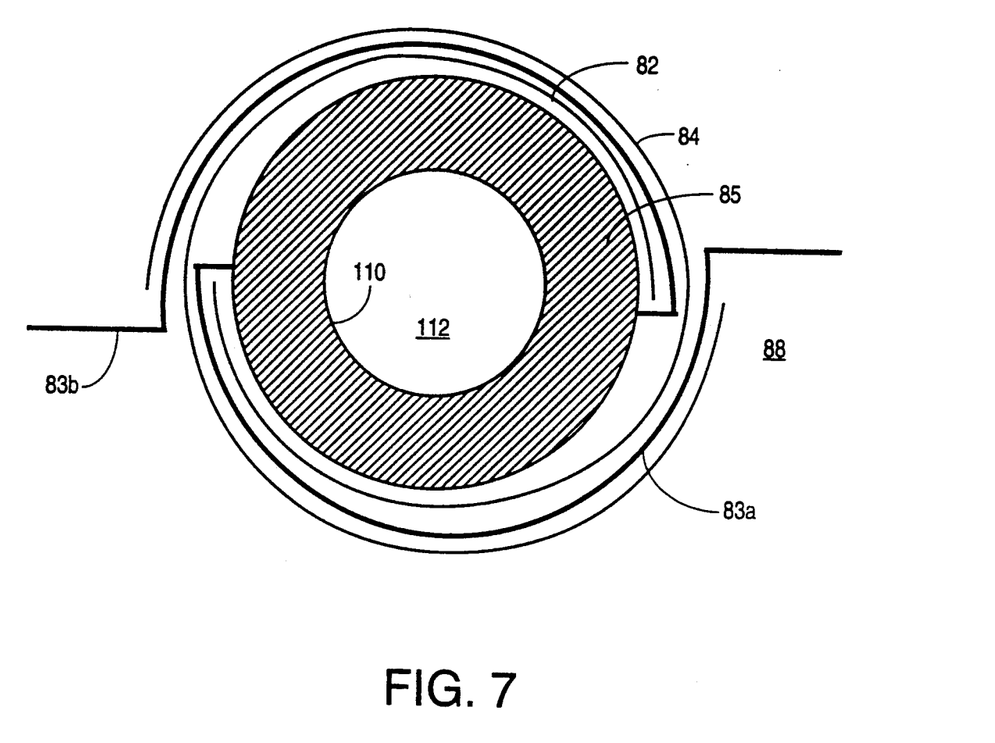
FIG. 7 is a plan view of spiral interlocking hinges with a center hinge in accordance with the present invention.

In one embodiment the two hinges overlap completely as shown in FIG. 7 so that each of the two hinges 82, 84 is a spiral interlocking with the other hinge. Thereby there are multiple grooves 82, 84, i.e. hinges, in any cross section between the center boss portion 112 of the diaphragm and the outside frame 88, further reducing the thermal conductance and providing more lateral stress isolation from the diaphragm to the frame. Also shown are metal traces 83a, 83b and heated bimetallic region 85. Alternatively, the heater may be a resistive heater formed for instance of a nickel alloy layer formed on top of the diaphragm. The width and spacing of the grooves and metal traces ar exaggerated in FIG. 7 for clarity.

Also shown in FIG. 7 is an additional center hinge 110 surrounding the center boss 112 portion of the microactuator to provide thermal isolation to the center boss 112 from the heated annular region 85. Center hinge 110 is similar in structure to hinges 82 and 84 but is circular and not split, since no conductive traces cross hinge 110. Hinge 110 in addition to further insulating the heated region 85 reduces the thermal mass that needs to be heated, thereby speeding up operation of the microactuator. Additionally it is desirable to insulate the center boss because the thermal loss thereof depends on whether (in a valve) the microactuator is opened or closed, since in the closed position there is increased thermal conduction across the valve seat to the outside package. This results undesirably in thermal hysteresis in the valve. The center hinge greatly reduces this undesirable effect.

It is to be understood that the above described structure, while in the context of a circular diaphragm, is also applicable to diaphragms having other shapes. The microactuator structure described above is also suitable for use in valves of the microminiature type as described in the above-cited U.S. Pat. No. 5,069,419.

The above description is illustrative and not limiting; further modifications will be apparent to one of ordinary skill in the art in light of the specification.

I claim:

1. A microactuator comprising:
   a support frame;
   a movable diaphragm having two layers of differing coefficients of thermal expansion and located in a central portion of the support frame; and
   a hinge formed of a thermally insulative material joining the diaphragm to the support frame, the hinge being of approximately equal thickness in cross section throughout.

2. The device of claim 1, further comprising a resistive heating element formed in one of the layers of the diaphragm.

3. The device of claim 2, further comprising:
   a second hinge adjacent to at least a portion of the first hinge and sapced apart therefrom by a predetermined distance along a length of the first hinge, thereby defining a bridge region of the diaphragm between the first and second hinges; and
   an electrical trace formed on the bridge region and connecting to the heating element.

4. The device of claim 3, wherein the first and second layers are both spiral in shape and the two spirals are interlocking.

5. The device of claim 3, wherein the two layers together define an annular region, and further comprising a third hinge formed of a thermally insulative material, the third hinge being circular and lying within a central region defined by the annular region, thereby thermally insulating the annular region from the central region.

6. The device of claim 1, further comprising a substrate defining a flow orifice and attached to the support frame thereby defining a gap between the diaphragm and the substrate, wherein the diaphragm when displaced closes the orifice.

7. The device of claim 1, wherein the hinge is U-shaped in cross section.

8. The device of claim 7, wherein a first portion of the "U" extends over a principal surface of the support frame, and a second portion of the "U" extends beyond a plane defined by a surface of the support frame opposite to the principal surface.

9. The device of claim 1, wherein the thermally insulative material is silicon dioxide.

10. The device of claim 9, wherein the thickness in cross section of the hinge is less than that of an adjacent part of the movable diaphragm.

11. A microactuator comprising:
a support frame;
a movable diaphragm having two layers of differing coefficients of thermal expansion, and located in a central portion of the support frame;
a heating element formed in one of the layers of the diaphragm;
a first hinge formed of a thermally insulative material joining the diaphragm to the support frame, the first hinge being of approximately equal thickness in cross section throughout;
a second hinge adjacent to at least a portion of the first hinge and sapced apart therefrom by a predetermined distance along a length of the first hinge, thereby dfining a bridge region of the diaphragm between the first and second hinges; and
an electrical trace formed on the bridge region and connecting to the heating element.

12. A microactuator comprising:
a peripheral portion;
a central portion,
a suspension connecting said central portion to said peripheral portion, the suspension including a hinge portion having two spaced apart parallel hinges and also including a suspension portion connected to the hinge portion;
first and second layers of the suspension portion having substantially different coefficients of thermal expansion; and
a heating element thermally coupled to the suspension portion.

13. The device of claim 12 where the hinge portion is substantially more flexible than the suspension portion.

14. The device of claim 12 where the hinge portion has substantially lower thermal conduction than the suspension portion.

* * * * *

UNITED STATES PATENT AND TRADEMARK OFFICE
CERTIFICATE OF CORRECTION

PATENT NO.   :   5,271,597
DATED        :   December 21, 1993
INVENTOR(S)  :   John H. Jerman It is certified that error appears in the above-identified patent and that said Letters Patent is hereby corrected as shown below:

```
Column 4, line 12
     delete "enlar9ed" and insert -- enlarged --.

Column 6, line 47
     delete "sapced" and insert -- spaced --.
```

Signed and Sealed this

Twenty-seventh Day of September, 1994

Attest:

BRUCE LEHMAN

Attesting Officer

Commissioner of Patents and Trademarks